US010092956B2

(12) United States Patent
Schneider

(10) Patent No.: US 10,092,956 B2
(45) Date of Patent: Oct. 9, 2018

(54) DEVICE AND METHOD FOR MACHINING AN OPTICAL WORKPIECE

(71) Applicant: Schneider GmbH & Co. KG, Fronhausen (DE)

(72) Inventor: Gunter Schneider, Marburg (DE)

(73) Assignee: Schneider GmbH & Co. KG, Fronhausen (DE)

( * ) Notice: Subject to any disclaimer, the term of this patent is extended or adjusted under 35 U.S.C. 154(b) by 144 days.

(21) Appl. No.: 14/402,860

(22) PCT Filed: May 15, 2013

(86) PCT No.: PCT/EP2013/001426
§ 371 (c)(1),
(2) Date: Nov. 21, 2014

(87) PCT Pub. No.: WO2013/174487
PCT Pub. Date: Nov. 28, 2013

(65) Prior Publication Data
US 2015/0128773 A1    May 14, 2015

(30) Foreign Application Priority Data

May 22, 2012 (EP) .................................... 12003982
May 24, 2012 (EP) .................................... 12004033
Jun. 6, 2012 (EP) .................................... 12004335

(51) Int. Cl.
*B23B 3/12* (2006.01)
*B24B 13/00* (2006.01)
(Continued)

(52) U.S. Cl.
CPC ................. *B23B 3/12* (2013.01); *B24B 13/00* (2013.01); *B24B 13/06* (2013.01); *B24B 41/02* (2013.01);
(Continued)

(58) Field of Classification Search
CPC ......... B23B 3/12; B23B 2226/45; B23B 5/36; B23B 5/40; B24B 13/00; B24B 14/02; B24B 47/08; B24B 47/14; Y10T 82/10; Y10T 82/2512; Y10T 82/2552; Y10T 82/2562; B23Q 5/28; B23Q 5/32; B23Q 5/34; B23Q 5/38; B23Q 2220/006;
(Continued)

(56) References Cited

U.S. PATENT DOCUMENTS 3,583,774 A * 6/1971 De Gast ................... B23Q 1/38
184/5
4,593,471 A * 6/1986 Nelle ................... G01B 5/0014
33/702

(Continued)

FOREIGN PATENT DOCUMENTS

DE    19910534 A1 * 10/1999    ............. B24B 51/00
EP    0439425 A1 * 7/1991    ............... B23Q 1/34

(Continued)

*Primary Examiner* — Alan Snyder
(74) *Attorney, Agent, or Firm* — David S. Safran

(57) ABSTRACT

A device and a method for machining of a flat side of an optical workpiece. The device has two flat guides and a side guide for fluidic guidance of a spindle unit and/or a slide. A linear drive with an assigned tool is located on a slide with a turntable. Highly accurate machining is enabled.

35 Claims, 6 Drawing Sheets

(51) Int. Cl.
*B24B 13/06* (2006.01)
*B24B 41/02* (2006.01)
*B24B 47/08* (2006.01)
*B24B 47/14* (2006.01)

(52) U.S. Cl.
CPC .............. *B24B 47/08* (2013.01); *B24B 47/14* (2013.01); *B23B 2226/45* (2013.01); *Y10T 82/10* (2015.01); *Y10T 82/2512* (2015.01)

(58) Field of Classification Search
CPC .......... B23Q 2705/10; B23Q 2705/102; B23Q 2705/14; B23Q 2705/16; B23Q 2705/182; B23Q 2717/003
See application file for complete search history.

(56) References Cited

U.S. PATENT DOCUMENTS

| | | | |
|---|---|---|---|
| 4,760,672 A | 8/1988 | Darcangelo et al. | |
| 4,928,435 A * | 5/1990 | Masaki | B24B 13/00 451/159 |
| 4,947,715 A | 8/1990 | Council, Jr. | |
| 5,042,935 A * | 8/1991 | Logan | B23Q 1/4857 351/154 |
| 5,957,637 A | 9/1999 | Savoie | |
| 6,523,443 B1 * | 2/2003 | Hof | B23Q 11/0032 82/1.4 |
| 7,089,835 B2 | 8/2006 | Bryan | |
| 8,210,781 B2 * | 7/2012 | Chang | B23Q 5/40 408/234 |
| 8,683,897 B2 | 4/2014 | Schneider et al. | |
| 2004/0140721 A1 * | 7/2004 | Chang | B23Q 1/626 310/12.05 |
| 2010/0224039 A1 * | 9/2010 | Schneider | B23Q 1/015 82/149 |

FOREIGN PATENT DOCUMENTS

| | | | |
|---|---|---|---|
| EP | 0 614 724 A2 | 9/1994 | |
| EP | 0 849 038 A2 | 6/1998 | |
| EP | 0872307 A1 * | 10/1998 | ......... B24B 13/0025 |
| EP | 2 011 603 A1 | 1/2009 | |
| GB | 2 164 275 A | 3/1986 | |

* cited by examiner

DEVICE AND METHOD FOR MACHINING AN OPTICAL WORKPIECE

BACKGROUND OF THE INVENTION

Field of the Invention

This invention relates generally to machining of preferably optical surfaces or workpieces, especially mirrors or lenses, especially preferably by face turning. In particular, this invention relates to a device with a linearly movable component for linear movement of the assigned workpiece or tool in the preferably horizontal direction of movement and to a method for face turning the workpiece in which the workpiece is rotated around an axis of rotation and the working tool being moved forward and back by means of a linear drive depending on the rotational position of the workpiece.

Description of Related Art

This invention relates especially to machining in a rotary lathe and to face turning. By means of a linear drive which is often also called a fast tool drive or fast tool arrangement, a tool, especially a lathe tool or cutting tool, is moved or fed linearly depending on the rotational position of the workpiece to be machined. Especially back and forth motion, also called oscillating motion or reciprocating motion, takes place. In this way, especially non-rotationally symmetrical machining can take place. Non-rotationally symmetrical surfaces or free-form surfaces are produced especially to implement desired optical properties of an optical component, a mirror or a lens. This device is known, for example, from European Patent Application EP 0 849 038 A2.

U.S. Pat. No. 7,089,835 B2 shows a device for machining of an optical workpiece. A workpiece drive allows the workpiece to rotate around a horizontal axis of rotation. The workpiece cannot be axially adjusted. The device has a first slide which can move parallel to the axis of rotation and a second slide which is carried by it and which can be moved transversely to the axis of movement. The second slide bears a turntable with a tool located on it. The slides form a slow tool drive or a slow tool arrangement. During machining, specifically the entire slide structure is moved depending on the rotational position of the workpiece.

SUMMARY OF THE INVENTION

The object of this invention is to devise a device for preferably machining or turning of a preferably optical workpiece and a method for machining, especially face turning, of an optical flat side of an optical workpiece, highly accurate machining being enabled or facilitated.

This object is achieved by a device and a method as described herein.

A first aspect of this invention lies in that the device has preferably two flat guides for fluidic guidance of a component which is moving linearly back and forth with the assigned workpiece or tool, the flat guides being located on two opposite sides of the component.

In particular, the two flat guides are on opposite sides at the same height, and thus, guide the component in a torsionally very stiff manner and very exactly in a horizontal plane.

The device preferably comprises a side guide which is especially located under the component for fluidic guidance of the component laterally transversely relative to the linear direction of movement of the component. In this way, extremely accurate, therefore highly precise guidance is enabled.

The side guide is preferably located in the middle between the flat guides and/or underneath the component. This allows very precise lateral guidance and minimizes tilting moments potentially acting on the component.

The side guide is preferably also made as a flat guide.

In this invention, the term "flat guide" is preferably defined as those guides whose length is more than 1.5 times, especially more than 5 times, their width.

In this invention, "fluidic guidance" is defined as guidance or support by means of a fluid, especially a gas such as air, on the one hand, or liquid on the other. Accordingly, preferably, aerostatic or hydrostatic guides are used. They allow very accurate guidance and/or guidance which is free of play with smooth running.

According to one version, the linearly movable component is especially a bearing part of a spindle, in the bearing part a spindle of the spindle unit being pivoted. The spindle is preferably provided with a receiver for holding the workpiece and can be set into rotation by means of a rotary drive. The component or the bearing part can be moved linearly especially in the horizontal direction or in the axial direction. Accordingly, the spindle unit can be moved in the direction of the axis of rotation of the spindle, and thus, in the direction of the tool.

The preferred guidance via two flat guides on opposite sides and one side guide located under the component or bearing part allows highly precise guidance of the spindle unit and the spindle, and thus, highly accurate machining of the workpiece.

Preferably, the axis of rotation of the spindle is in a horizontal plane, the flat guides and their pockets and bearing surfaces being located or running in or symmetrically to this horizontal plane. This is conducive to highly accurate guidance, and thus, also highly accurate machining.

Preferably, the side guide and its pockets and bearing surfaces are located in or symmetrically to a vertical plane which contains the axis of rotation of the spindle. This is conducive to highly accurate guidance and thus also highly accurate machining.

According to another aspect of this invention which can also be implemented independently of the preferred guide, the device comprises a workpiece drive with two linear motors or rotors which are connected especially directly to the bearing part for linear movement of the bearing part and thus of the spindle unit in the direction of movement or in the direction of the axis of rotation.

The linear motors or rotors are preferably made coreless.

The linear motors or rotors are arranged preferably symmetrically to a vertical plane which contains the direction of movement and/or above the axis of rotation of the spindle or at least essentially in one horizontal plane. Alternatively, the linear motors can also be located on opposite sides of the bearing part or of the spindle unit or symmetrically relative to the axis of rotation of the spindle. This is conducive to highly accurate movement, especially at least largely free of a tilting moment, of the spindle unit, and thus, of the spindle and also of the workpiece. Therefore, highly accurate machining of the workpiece is enabled or facilitated.

According to another aspect of this invention which can also be implemented independently, the workpiece drive preferably has a scale which is connected directly to the bearing part or the spindle unit. This allows a very close arrangement of the scale on the spindle and/or close to the spindle head and thus highly accurate measurement of the actual axial location of the spindle so that very accurate control or adjustment is enabled accordingly. This is, in turn, conducive to highly accurate machining of the workpiece.

The bearing part is preferably made at least essentially cylindrical and/or comprises preferably an at least essentially cylindrical outer contour. This is conducive to a very compact and/or light structure. In particular, this execution is conducive to a largely uniform or defined deformation during temperature fluctuations so that highly accurate guidance or movement is supported or facilitated and thus accordingly highly accurate machining is enabled or facilitated.

According to another aspect of this invention, the component is or forms preferably a slide. In this case, the guides in accordance with the invention, therefore the two flat guides and the side guide, lead to very accurate guidance of the slide and thus enable or facilitate very accurate machining of the workpiece.

Especially preferably, the slide bears a turntable and/or a linear motor with the tool.

Preferably, the middle axis of the side guide intersects the axis of the turntable. This is conducive to very accurate guidance and therefore enables or facilitates highly accurate machining.

Preferably, the tool can be moved linearly back and forth by means of the linear drive. The direction of movement or axis of movement of the tool preferably intersects the rotational axis of the turntable. This is conducive to highly accurate pivoting alignment and/or feed of the tool and therefore enables or facilitates very accurate machining of the workpiece.

Especially preferably, the guide in accordance with the invention is implemented both on the tool side and the workpiece side; therefore, the guide is intended especially both for support and guidance of the spindle unit and also for the support and guidance of the slide.

Especially preferably, the guides in accordance with the invention each comprises two pockets which are opposite in pairs. This is conducive to highly accurate support and guidance, and thus, highly accurate machining.

Especially preferably, the flat guide and/or the side guide each comprises/comprise a blade with assigned opposite pockets for fluidic support. This is conducive to highly accurate support and guidance and thus highly accurate machining.

Especially preferably, the pockets are tightly connected to the respective component or blade and can be moved together with the latter. In this way, highly accurate guidance in the intended linear motion of the component is achieved, in particular different overhangs and deflections can be avoided which otherwise can vary with stationary pockets depending on the location of the component.

Especially preferably, the flat guides and the side guide for the spindle unit and/or for the slide are made as a hydrostatic guide.

According to another aspect of this invention, preferably, the contact point of a cutting edge of the tool with the workpiece to be machined is varied during machining of a flat side of the workpiece. This takes place especially by a pivoting of the tool or linear drive which bears the workpiece, preferably around a vertical axis. Thus, in particular, for machining of a workpiece of very long duration the wear which occurs can be compensated and/or the entire cutting edge or a larger part of the cutting edge of the tool can be used for machining, as a result of which highly accurate or more accurate machining of the workpiece is enabled. This applies especially to highly precise machining in which a new tool is used for each workpiece. This preferred type of machining can however fundamentally also be used when one tool is used for machining of several workpieces.

Especially preferably, a turntable is used for pivoting. The turntable bears especially the linear drive with the tool.

According to another aspect of this invention, the workpiece is preferably rotated around an axis of rotation and can be supplied to the tool in the direction of the axis of rotation by means of at least one linear motor, the linear drive with the tool which can move back and forth being adjustable by means of a slide in a direction that is transverse to the axis of rotation and is pivotable by means of the turntable carried by the slide around an axis transversely to the axis of rotation and transverse direction. This enables minimization of the required path of motion or adjustment path of the tool and thus of the linear drive, and thus, minimization of the required stroke for the very rapid, especially oscillating movement of the tool. Feed which is much slower compared to the tool movement then takes place specifically on the workpiece side, specifically by axial movement of the workpiece. Preferably, in addition, the machining angle of the tool can be set by turning of the turntable, and thus, pivoting of the linear drive. In this way, optimum machining of very different workpieces or optical flat sides of workpieces can take place with very few faults and especially highly accurate machining of complicated surfaces can take place, for example, in the production of Fresnel lenses. Accordingly, highly accurate machining is enabled or at least facilitated.

Individual of the aforementioned and following aspects and features of this invention can be combined at will with one another, but can also be implemented independently of one another.

Other aspects, features, advantages and properties of this invention will become apparent from the following description of a preferred exemplary embodiment with reference to the accompanying drawings.

DETAILED DESCRIPTION OF THE INVENTION

Figure 1:
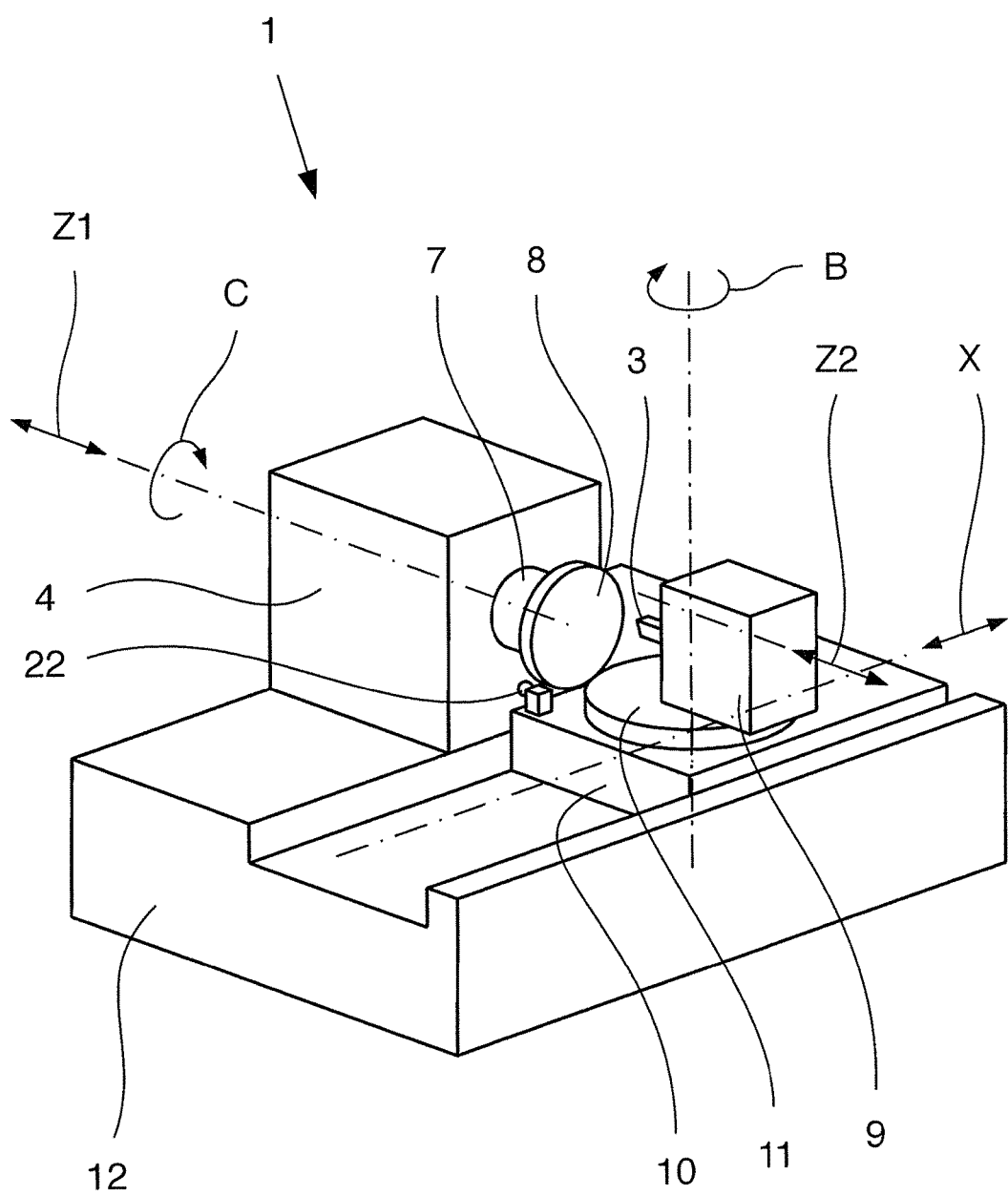
FIG. 1 is a schematic perspective view of a device in accordance with the invention.
Figure 2:
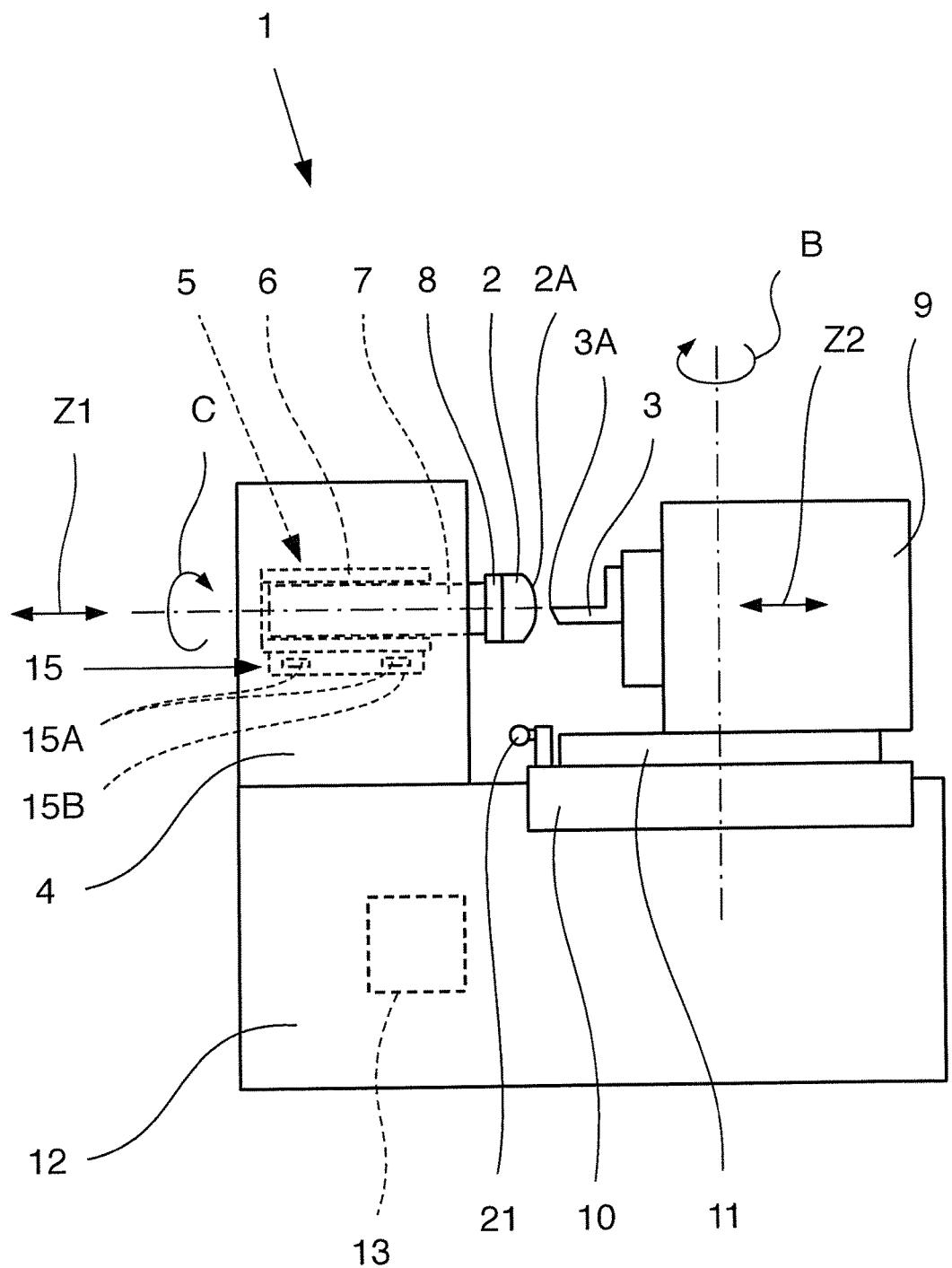
FIG. 2 is a first schematic side view of the device.

FIGS. 1 and 2 show a device 1 in accordance with the invention for forming of a preferably optical workpiece 2, especially an optical surface, for example, of a heads-up display, mirror or a lens. Preferably, the workpiece 2 or its surface or flat side 2A is machined by turning, especially by face turning.

It is noted that the workpiece 2 to be machined is not shown in FIG. 1 for reasons of simplification, but is shown in FIG. 2.

The starting point for the formation or machining is a blank. The latter is machined or otherwise formed and optionally worked in further machining steps such that, at the end, a finished optical workpiece 2 with the desired optical properties is formed. The term "workpiece" within the framework of this description preferably designates both the blank before carrying out the pertinent machining steps as well as the finished workpiece 2 at the end.

The workpiece 2 is preferably made of metal or plastic. But, fundamentally, some other material which can otherwise be suitably machined can also be used.

The workpiece 2 is machined by means of a tool 3 which machines the workpiece 2 or its flat side 2A. Especially preferably, the tool 3 has a very wear-resistant cutting edge 3A, especially of diamond, as only suggested in FIG. 2.

Preferably, the device 1 has a workpiece drive 4. The workpiece drive 4 is used to allow the workpiece 2 which is to be machined to rotate. The device 1 and the workpiece drive 4 preferably have a spindle unit 5—also called a center sleeve. The spindle unit 5, for its part, has a bearing part 6 and a spindle 7 which is pivoted in it, as suggested especially in FIG. 2.

The spindle 7 is especially a preferably directly driven, precisely mounted shaft or a direct drive or some other drive with preferably integrated or assigned cutting point or collet or receiver 8 for the workpiece 3 or the blank. Fundamentally, direct reception or clamping, for example, via a membrane chuck or vacuum chuck, can take place, if necessary the workpiece 2 or the blank can also be held indirectly via a holder (not shown). The workpiece 2 or the holder is then clamped, for example, by means of a vacuum chuck or membrane chuck, as a receiver 8.

The workpiece 2 or the holder can preferably be clamped in a certain axial position and/or rotational position and/or can be turned in a defined manner to be able to machine the workpiece 2 in a defined manner.

By means of the workpiece drive 4 or the spindle unit 5 or spindle 7, the clamped or held workpiece 2 can be set into rotation around a C axis for machining. The spindle unit 5 or spindle 7, therefore, forms especially a rotary drive for the workpiece 2. The workpiece drive 4 forms especially a computed or controlled axis of rotation C. Especially preferably, the workpiece 2 can be set into rotation in a controlled or adjusted manner with a certain rpm and/or with a defined rotational position.

In addition, the workpiece 2 can preferably also be moved in the direction of the axis of rotation C or axially—therefore, linearly in a direction or axis of movement Z1. Especially preferably, a computed or controlled linear axis Z1 is formed. The workpiece drive 4 is preferably made accordingly for this purpose.

The device 1 has preferably a linear drive 9. The tool 3 is held by the linear drive 9 and can be moved back and forth by means of the linear drive 9 relative to the workpiece 2, linearly in a direction or axis of movement Z2, as suggested by the corresponding double arrow. The tool 3 can be moved very quickly back and forth or in an oscillating or reciprocating manner by means of the linear drive 9. In particular, the tool 3 can be moved in a computed or controlled manner so that a computed or controlled linear axis Z2 is formed.

In particular, the linear drive 9 forms a so-called fast-tool drive or a fast-tool arrangement for rapid movement of the tool 3 back and forth, especially depending on the rotational position of the workpiece 2. In particular, the tool 3 can be moved back and forth, if necessary repeatedly back and forth, by means of the linear drive 9 during one revolution of the workpiece 2 in order to be able to produce especially non-rotationally symmetrical surfaces or flat sides 2A on the workpiece 2.

The workpiece 2 and the tool 3 can be adjusted preferably transversely to one another in the X direction. The device 1 for this purpose preferably has a slide 10 which can be adjusted or moved in the X direction. In particular the slide 10 can be moved in a computed or controlled manner so that a computed or controlled linear axis X is formed.

Preferably the linear drive 9 is located on the slide 10 or is carried directly or indirectly by it.

The tool 3 can be pivoted preferably relative to the workpiece 2, especially around a pivoting axis B, in particular in order to be able to adjust the setting angle of the tool 3 relative to the workpiece 2. Especially preferably controlled or computed pivoting is enabled, and therefore, a computed or controlled rotational axis B is formed.

Preferably, the device 1 comprises a turntable 11 for turning or pivoting the linear drive 9, and thus, the tool 3. The linear drive 9 is preferably located on the turntable 11, especially off-center and/or in an edge region or is carried by it.

The turntable 11 is for its part located preferably on the slide 10 and is carried by it. Therefore, the slide 10 preferably bears both the turntable 11 and the linear drive 9 which is located on it.

The device 1 preferably has a frame or machine bed 12 which, as shown in the illustrated example, bears or guides especially the workpiece drive 4 and/or the slide 10.

The device 1 preferably has a control apparatus 13 which is only suggested in FIG. 2 and which can be formed by a memory-programmable control, CNC control (numerical or computer-supported control) or can contain one and/or can control such a control. The control apparatus 13 is used especially to control or adjust the workpiece drive 4, linear drive 9, slide 10 and/or turntable 11.

Preferably, a respective CNC axis is formed by the B axis, C axis, X axis, Z1 axis and/or the Z2 axis.

Especially preferably, in the illustrated example, only two linear axes are stacked/intersect on the tool side, specifically the X axis and the Z2 axis.

Preferably, in the illustrated example, three axes are stacked/intersect, specifically the two linear axes X and Z2 and the rotational axis B.

Especially preferably, the fast Z2 axis or the tool axis or the direct drive for the tool 3, here therefore the linear drive 9, is arranged in the stacking of the axes as the uppermost axis or is located at the top.

The C axis or Z1 axis runs preferably at least essentially horizontally.

The Z2 axis runs preferably at least essentially horizontally.

In particular, the two linear axes Z1 and Z2 run in a common horizontal plane.

The transverse feed or the X direction or axis runs preferably horizontally and/or transversely, especially perpendicularly to the Z1, Z2 and/or C direction or axis.

The axis of rotation or the rotational axis B runs preferably transversely, especially perpendicularly, to the axis of rotation C and/or X, Z1 and/or Z2 direction or axis.

In particular the axis of rotation B in the illustrated example runs at least essentially vertically.

Preferably, the B axis intersects the Z2 axis.

Preferably, the Z2 direction or axis runs through the center of rotation of the turntable 11.

Preferably, the tool 3 or its cutting edge 3A is at least essentially or directly adjacent to or in the region of the B axis.

In particular, the tool 3 or its cutting edge 3A is moved by means of the linear motor 9 to the B axis or beyond it during the linear motion in machining in the Z2 direction and/or at maximum stroke.

In the illustrated example, the axis of movement or linear axis Z2 runs preferably at least essentially parallel to the axis of rotation C of the workpiece 3. The direction of the Z2 axis, on the one hand, and the direction of the Z1 axis or the axial alignment of the axis of rotation C on the other can run parallel to one another or tilted to one another and/or can be adjusted or tilted to one another for example, in order to be able to produce or machine the flat side 2A of a Fresnel lens or a Fresnel mirror. For a relative inclination, the latter is preferably small or limited such that the preferred face turning can still take place for machining of workpiece 2 in the desired or necessary manner.

Preferably, the Z1 axis is used for basic feed of the workpiece 2 and tool 3, especially over greater travel or feed paths, for example, for a high curvature and a large diameter of the surface or flat side 2A which is to be machined or produced and/or for example, for clamping or changing of the workpiece 2 and/or of the tool 3. Preferably, there is no movement of the Z1 axis which is dependent on the rotational position of the workpiece 2 or of the spindle 7 or in the Z1 direction. In particular, the Z1 axis is a slow slide servo axis or slow servo axis and is preferably also used in turning length machining.

Preferably, the linear drive 9 is an electrically operating axle drive, especially a so-called fast tool drive in order to control the tool 3 or move it rapidly forward and back in particular depending on the rotational position of the workpiece 2 and/or depending on the distance of the tool 3 from the axis of rotation C of the spindle 7 in its axial position or Z2 axis. The linear drive 9 allows a preferably linear and/or controlled or adjusted movement of the tool 3, and therefore, preferably forms a controlled or adjusted linear axis Z.

The linear axis Z2 therefore, in contrast to the Z1 axis, forms a preferably highly dynamic or fast axis or movement, in particular depending on the rotational position of the workpiece 2 or of the spindle 7. Therefore, the linear drive 9 is used in particular for a very rapid movement of the tool 3 in the Z2 direction depending on the rotational position of the workpiece 2 with, however, a comparatively small stroke. The maximum stroke or travel path of the linear drive 9 or of the tool 3 is preferably several mm, especially more than 10 mm and/or 12 mm, especially preferably roughly 15 mm, in particular at a frequency of movement of more than 25 or 50 Hz and/or at accelerations of more than 50 m/s$^2$ or 100 m/s$^2$, especially preferably of roughly 300 m/s$^2$. The tool 3 can also be moved back and forth during one revolution of the workpiece 2 preferably several times in the Z2 direction.

The control or adjustment of the Z2 axis, therefore the motion of the tool 3, takes place preferably via the control apparatus 13, especially the rotational position of the workpiece 2 or the receiver 8 or spindle 7 being detectable via an angle transducer or the like (not shown) especially on or in the spindle unit 5.

During the machining of the workpiece 2, it is preferably moved relative to the tool 3 in the X direction in order to enable the desired surface machining, especially of a surface or flat side 2A. To do this, the workpiece drive 4 and the linear drive 2 can be moved or adjusted accordingly relative to one another. In particular, machining can take place as described in European Patent Application EP 0 849 038 A2 or German Patent Application DE 10 2009 011 194 A2 which corresponds to U.S. Pat. No. 8,683,897, for example.

Preferably, the tool 3 can be adjusted for fine setting or height setting also in the vertical direction (conventionally called the Y direction) in order to ensure that the tool 3 can be moved in transverse feed in the X direction through the axis of rotation C, therefore the workpiece 2 or the flat side 2A can also be machined in the region of the axis of rotation C. In particular the result can be that the axes Z1 and Z2 of movement lie in a common horizontal plane.

Especially preferably, the aforementioned fine setting or height setting is formed by a solid joint and/or a drive for exclusive fine setting or adjustment (not shown). The solid joint or some other fine setting can be implemented, for example, on or by means of a holder 9A of the linear drive 9 for receiving or holding the tool 3 or in some other way.

Figure 3:
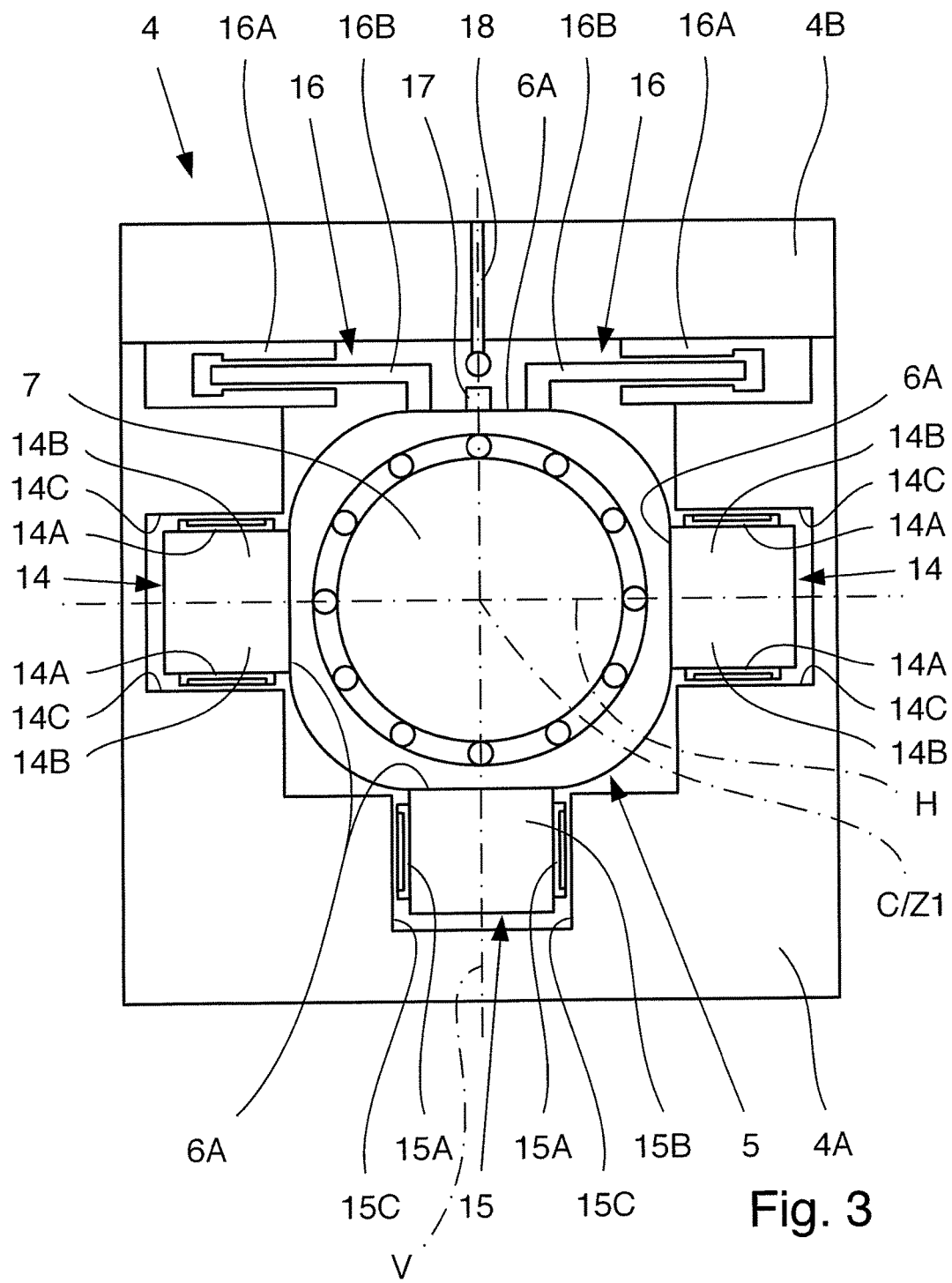
FIG. 3 is a schematic sectional view of a workpiece drive of the device.

Using FIG. 2 and the schematic section of the tool drive 4 as shown in FIG. 3, an especially preferred structure of the tool drive 4 and an especially preferable guide structure according to an aspect of this invention are explained below.

The spindle unit 5 or its bearing part 6 can be moved preferably linearly, in the illustrated example, in the Z1 direction. The spindle unit 5 or the bearing part 6, therefore, constitute a linearly movable component for linear movement of the assigned workpiece 2 or tool 3, here, the workpiece 2. The corresponding applies to the slide 10 and the holder 9A which each constitute such a linearly movable component within the scope of this invention. But this will be explained below.

The device 1 or the workpiece drive 4 preferably comprises two flat guides 14 and/or a side guide 15 for fluidic guidance of the component, here rather the spindle unit 5 or the bearing part 6, as shown in FIG. 3.

The flat guides 14 are located on two opposite sides of the component or bearing part 6 and/or are used for guidance of the component or bearing part 6 in the vertical direction on opposite sides of the component or bearing part 6. In particular, the flat guides 14 are located horizontally next to or on both sides of the spindle 7 or axis of movement Z1 or axis of rotation C.

Especially preferably, the flat guides 14 are located in or symmetrically to a horizontal plane H which contains the axis of movement Z1 or rotational axis C.

The side guide 15 is used preferably for fluidic guidance of the component or bearing part 6 laterally transversely to the direction of movement Z1 or the axis of rotation C. The side guide 15 is preferably located under the component or bearing part 6 or the spindle 7. The side guide 15 is located especially in or symmetrically to a vertical plane V which contains the axis of movement Z1 or the axis of rotation C.

The flat guides 14 and the side guide 15 are preferably built at least very similarly or identically. Therefore, first of all, a especially preferred structure of the side guide 15 is explained below, these explanations and details applying especially accordingly to the flat guides 14 which are made especially preferably identical.

The side guide 15 has pockets 15A for fluidic guidance or support, especially pockets 15A which are in opposed pairs, especially preferably two pairs of opposite pockets 15A, as represented in FIG. 2. The side guide 15 preferably has a blade 15B which bears the pockets 15A.

The pockets 15A are preferably arranged in pairs on opposite sides of the blade 15B face turning away from one another.

The blade 15B is made bar-shaped, preferably at least essentially or in sections and/or in cross section transversely to the axis C or Z1 preferably at least essentially rectangular.

The longitudinal direction or longitudinal extension of the blade 15B preferably extends parallel to the direction or axis C1 and Z1 respectively.

The pockets 15A are preferably located on the flat sides of the blade 15B.

The pockets 15A can be seated on the blade 15B or can extend into it or into the respective side surface.

Preferably, the blade 15B is made of steel. In addition or alternatively, the blade 15B can be occupied or partially covered laterally or on the flat side with strips of another material, for example, of brass, especially to ensure certain sliding properties in failure of the fluidic support. Preferably then, the pockets 15A are inserted into these strips or are located between them.

It should be noted that instead of a preferably continuous blade 15B, the pockets 15A can also be connected in some other way, for example, via separate holders, to the component or bearing part 6.

The side guide 15 or its blade 15B extend preferably to more than 50%, especially to more than 80% of the length of the component or bearing part 6 and/or at least essentially over the entire axial length of the component or bearing part 6.

The side guide 15 or the pockets 15A or the blade 15B is or are preferably connected tightly to the component or bearing part 6, in particular located or attached, especially preferably screwed to a flat 6A of the preferably at least essentially hollow cylindrical bearing part 6, as schematically suggested in FIG. 3. The pockets 15A are accordingly connected tightly together with the component or bearing part 6 and can move together with it.

The pockets 15A of one side of the side guide 15 or of the blade 15B interact with a preferably continuous or common sliding or bearing surface 15C.

In particular, the side guide 15 has two bearing surfaces 15C which are spaced apart from one another, which run parallel to one another, which face especially toward one another and between which the pockets 15A are located.

The blade 15B and the pockets 15A are located at least partially between the bearing surfaces 15C in the illustrated example.

In the illustrated example, the bearing surfaces 15C are formed preferably by a housing part 4A of the workpiece drive 4. But, they can also be formed by corresponding installation parts or the like.

Preferably, the pockets 15B are each located in the region of an axial end of the component or bearing part 6 or blade 15B. This is conducive to very good guidance transversely to the direction of movement Z1 or to good lateral guidance.

The side guide 15 preferably forms a "flat guide" in the sense that the length of the guide, here therefore the distance of the pockets 15A in the axial direction—therefore in the Z1 direction—is more than 1.5 times, especially preferably more than 5 times the width of the guide, here of the distance of the pockets 15A which are located on opposite sides of the blade 15B or of the distance of the bearing surfaces 15C.

For fluidic support, the pockets 15A are exposed to a corresponding fluid, in particular a gas or a liquid. The fluid is supplied via corresponding lines and/or channels (not shown), for reasons of simplification. Then, in operation, a fluid film is formed between the respective pocket 15A and the assigned bearing surface 15B, the fluid pressure acting oppositely due to the arrangement of the pockets 15A which is preferably opposite in pairs, and in this way, holding and guiding the blade 15B or the pockets 15A in a defined manner between the bearing surfaces 15 and especially movably in the direction of movement Z1 or longitudinal direction of the side guide 15 or of the blade 15B.

The flat guides 14 are preferably built similarly or according to the side guide 15, therefore have especially pockets 14A, blades 14B which bear the latter, and slide or bearing surfaces 14C which are assigned to the pockets 14A. The bearing surfaces 14C are formed or held preferably in turn by the housing part 4A and/or some other installation component.

The bearing surfaces 14C of a flat guide 14 in turn preferably point toward one another and/or run parallel to one another and/or extend preferably in the direction of movement Z1.

The bearing surfaces 14C extend preferably horizontally. The bearing surfaces 15C, conversely, extend preferably vertically.

The lower bearing surfaces 14C of the two flat guides 14 lie preferably in a common plane. The corresponding also applies preferably to the upper bearing surfaces 14C of the two flat guides 14.

The pockets 14A or blades 14B of the flat guides 14 are preferably fastened, especially screwed on, opposite sides or flats 6A of the component or of the bearing part 6. In particular, these two flats 6A for the flat guides 14 run parallel to one another and/or extend vertically.

In general, it should be noted that the flats 6A of the bearing part 6 extend preferably at least essentially over the entire length of the bearing part 6.

The open gap width between the pockets 14A and 15A and assigned bearing surfaces 14C and 15C is preferably at least essentially 20 to 30 μm.

The flat guides 14 are used for vertical support or mounting of the component or bearing part 6 or of the spindle unit 5, the mobility in the Z1 direction being maintained, but preferably they do not form a lateral guide. The lateral guide is formed preferably exclusively by the side guide 15.

The side guide 15 preferably does not guide in the vertical direction, but preferably exclusively laterally or transversely to the axis of movement Z1 and/or in the horizontal direction, the desired longitudinal mobility in the Z1 direction being maintained.

The flat guide 14 and the side guide 15 or their pockets 14A, 15A are preferably made for fluidic support or guidance by a liquid such as oil, especially therefore for hydrostatic guidance or support.

The bearing part 6 preferably comprises an at least essentially cylindrical outside contour. This is conducive to a compact, light structure.

The bearing part 6 preferably comprises an at least essentially cylindrical inside contour for receiving and pivoting the spindle 7. Corresponding bearings or bearing elements are only schematically suggested in FIG. 3. Preferably, the spindle 7 is supported aerostatically or is pivotally mounted via air bearings which are not further shown in the bearing part 6.

Furthermore, the spindle unit 5 comprises a rotary drive (not shown), in particular an electric motor for rotary driving of the spindle 7. The electric motor is located especially in the spindle unit 5 or in the bearing part 6.

Figure 4:
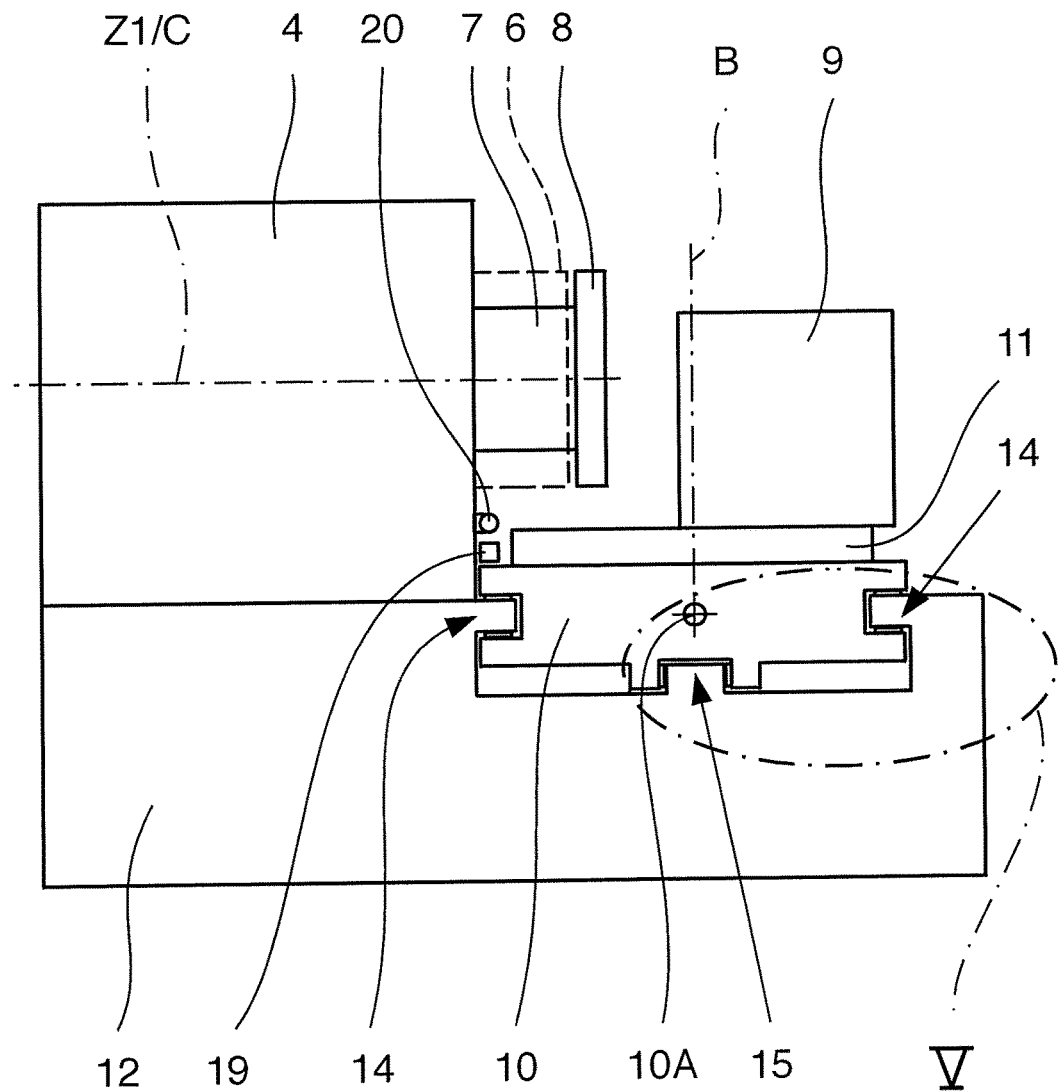
FIG. 4 is a second schematic side view of the device with a somewhat more detailed slide and with a suggested turntable and linear drive.

The bearing part 6 can extend beyond the housing of the workpiece drive 4 toward the spindle head or as far as the receiver 8 and can radially cover the spindle 7 and/or support it as near as possible to the receiver 8, as suggested by the broken line in FIG. 4.

The device 1 or the workpiece drive 4 preferably comprises at least one especially coreless linear motor 16, especially preferably two linear motors 16 for linear movement of the component or bearing part 6 or of the spindle unit 5, and thus, of the spindle 7 and of the workpiece 2 in the axial direction or Z1 direction, as suggested in FIG. 3.

The linear motors 16 can preferably be electrically driven and each have especially one stator or one secondary part 16A and one assigned rotor or one primary part 16B.

The primary part 16B has the required exciter windings and is built especially coreless. It is made preferably at least essentially plate-shaped.

The secondary part 16A is located stationary here, especially preferably on the housing part 4A and/or some other installation part. It is preferably made U-shaped and/or assembled from permanent magnets.

The linear motors 16, secondary parts 16A and/or primary parts 16B extend preferably at least essentially along the bearing part 16, parallel to the axis Z1 and/or in a horizontal plane.

The linear motors 16 or their primary parts 16B are preferably connected directly and/or tightly to the component or bearing part 6 or the spindle unit 5, especially fastened preferably to a preferably upper flat 6A of the bearing part 6, especially preferably screwed on.

The linear motors 16 or primary parts 16B are preferably located above the axis C or Z1 and/or the spindle 7 and/or flat guides 14 and/or symmetrically to or on opposite sides of the vertical plane V which contains the axis C or Z1.

The linear motors 16 work preferably electrically and are used especially for controlled or adjusted movement of the component or bearing part 6 of the spindle unit 5 or the spindle 7 or the workpiece 2 in the axial direction or Z1 direction.

The workpiece drive 4 or its housing part 4A preferably has a cover 4B which covers the spindle unit 5 and/or the bearing part 6 and/or the housing part 4A or the linear motors 16.

The device 1 or its tool drive 4 preferably has a measuring apparatus, especially a scale 17 and an assigned sensor apparatus or detection apparatus 18 in order to be able to detect or determine the axial position of the component or of the bearing part 6 or of the spindle unit 5 and thus of the spindle 7 or of the workpiece 2. In particular contactless, especially preferably optical, in particular interferometric detection or acquisition takes place.

The scale 17 is preferably provided with corresponding lattice divisions or with corresponding fluting, markings, patterns, or the like in order to be able in particular to optically detect the axial location or position.

The scale 17 is preferably connected tightly to the component or bearing part 6 or the spindle unit 5. In particular the scale 17 is located on the bearing part 6 and/or above the spindle 7 and/or in particular is screwed onto a flat 6A of the bearing part 6.

The scale 17 is preferably clamped tightly only in the region of its end which is adjacent to the workpiece 2 or the receiver 8 of the spindle 7 or is tightly connected to the bearing part 6 in order not to apply stresses to the scale 17 in thermal longitudinal deformation of the bearing part 6 or in order to mount the scale 17 free of stresses. In particular the most favorable position with respect to the workpiece 2 or tool 3 is sought. Expressed more generally, it is preferably provided that the scale 17 is clamped tightly only in one region as near as possible to the desired measurement point or is tightly connected to the assigned component.

The scale 17 is produced from a material which preferably does not appreciably thermally deform, especially glass or ceramic.

Figure 5:
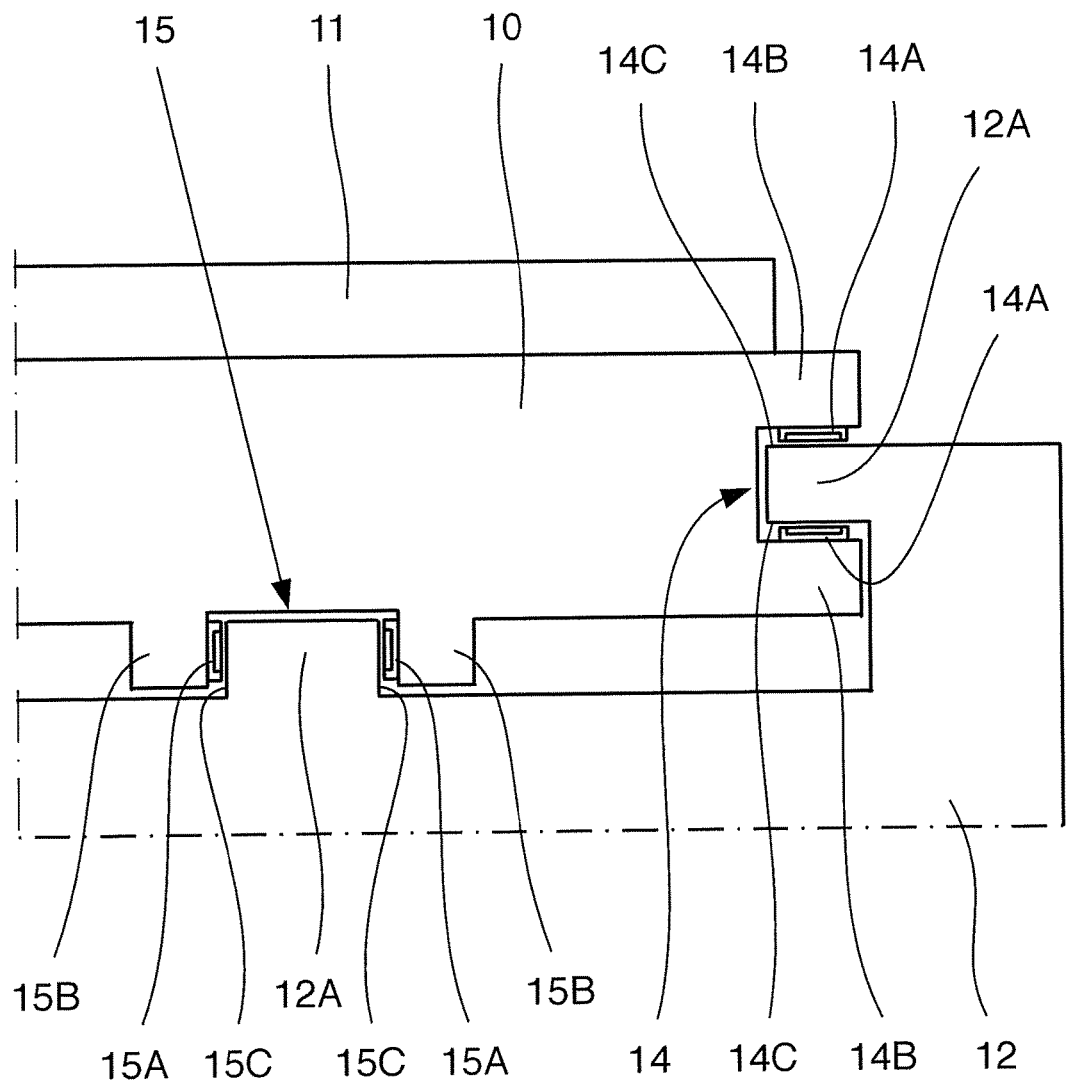
FIG. 5 is an enlarged view of a portion of the slide and assigned machine bed in the region of the flat guide and a side guide.

The preferred support and guidance of another linearly movable component of the device 1, specifically here in particular the slide 10, are detailed below. FIG. 4 shows the device 1 in a schematic side view which is more detailed relative to the preferred guide structure. FIG. 5 shows an enlarged extract from FIG. 4 in a schematic extract enlargement.

Preferably, the linearly movable component here is or forms the slide 10. The device 1 for linearly movable guidance of the component or the slide 10 has preferably two flat guides 14 and/or one side guide 15. The guides 14 and 15 are preferably built accordingly or at least essentially similarly, like the guides 14 and 15 which have already been described using the workpiece drive 4 or with respect to the supporting of the bearing part 6 so that the statements and explanations in this respect apply in particular accordingly or in a supplementary manner. Especially only some particulars are emphasized below.

The device 1 preferably has a slide drive 10A, especially a direct drive, such as a linear motor or an indirect drive, especially preferably a threaded drive or a hydrostatic threaded spindle or the like, as schematically suggested in FIG. 4.

The axis of the slide drive 10A and of a drive spindle of this drive 10A runs preferably horizontally and/or parallel to the X direction or in the X direction and/or along a longitudinal center plane of the slide 10.

The slide drive 10A is preferably located underneath the turntable 11 and/or above the side guide 15 or in the middle or longitudinal middle axis of the slide 10.

The flat guides 14 or their pockets 14A and/or bearing surfaces 14C are arranged preferably at least essentially in or symmetrically to a horizontal plane which contains the slide drive 10A and/or the axis of the slide drive 10A.

The axis of rotation B intersects preferably the longitudinal center axis of the slide 10 and/or axis of the slide drive 10A and/or a center axis of the slide guide 15.

The side guide 15 or its pockets 15A and/or bearing surfaces 15C is or are arranged preferably symmetrically to a vertical plane which contains the axis of the slide drive 10A and/or rotational axis B.

The guides 14 and 15 each preferably have bearing surfaces 14C and 15C which face away from one another. The pockets 14A and 15A of the respective guide 14 and 15 are therefore arranged in pairs face turning toward one another and/or oppositely on two spaced blades 14B and 15B, as is especially apparent from FIG. 5.

The blades 14B and 15B run preferably in the longitudinal direction or X direction and/or parallel to one another. The sliding or bearing surfaces 14C and 15C of guides 14 and 15 are each preferably formed on a rib-like or strip-like projection 12A of the machine bed 12 or some other installation part. The projections 12A each fit between the assigned blades 14B or 15B or the pockets 14A and 15A which point toward one another.

The bearing surfaces 14C and/or 15C are therefore preferably formed by the machine bed 12 and/or corresponding installation parts or attachment parts.

The pockets 14A and/or 15A are preferably attached to the component or slide 10.

The pockets 14A and/or 15A preferably face in pairs toward one another.

The bearing surfaces 14C and/or 15C of a guide 14 and 15 respectively face away from one another or in opposite directions and/or are especially preferably located on opposite sides of a strip-shaped projection 12A which is formed in particular by the machine bed 12 or other installation part.

The flat guides 14 and/or side guide 15 or the pockets 14A and 15A are preferably made for hydrostatic support of the component or slide 10.

The device 1 in accordance with the invention, as the linearly movable component, not only has the bearing part 6 and the spindle unit 5 and/or the slide 10, but alternatively or additionally preferably also the holder 9A with the assigned tool 3. This component or the tool 3 and the holder 9A can move forward and back by means of the linear drive 9, in particular depending on the rotational position of the workpiece 2, as already described.

Figure 6:
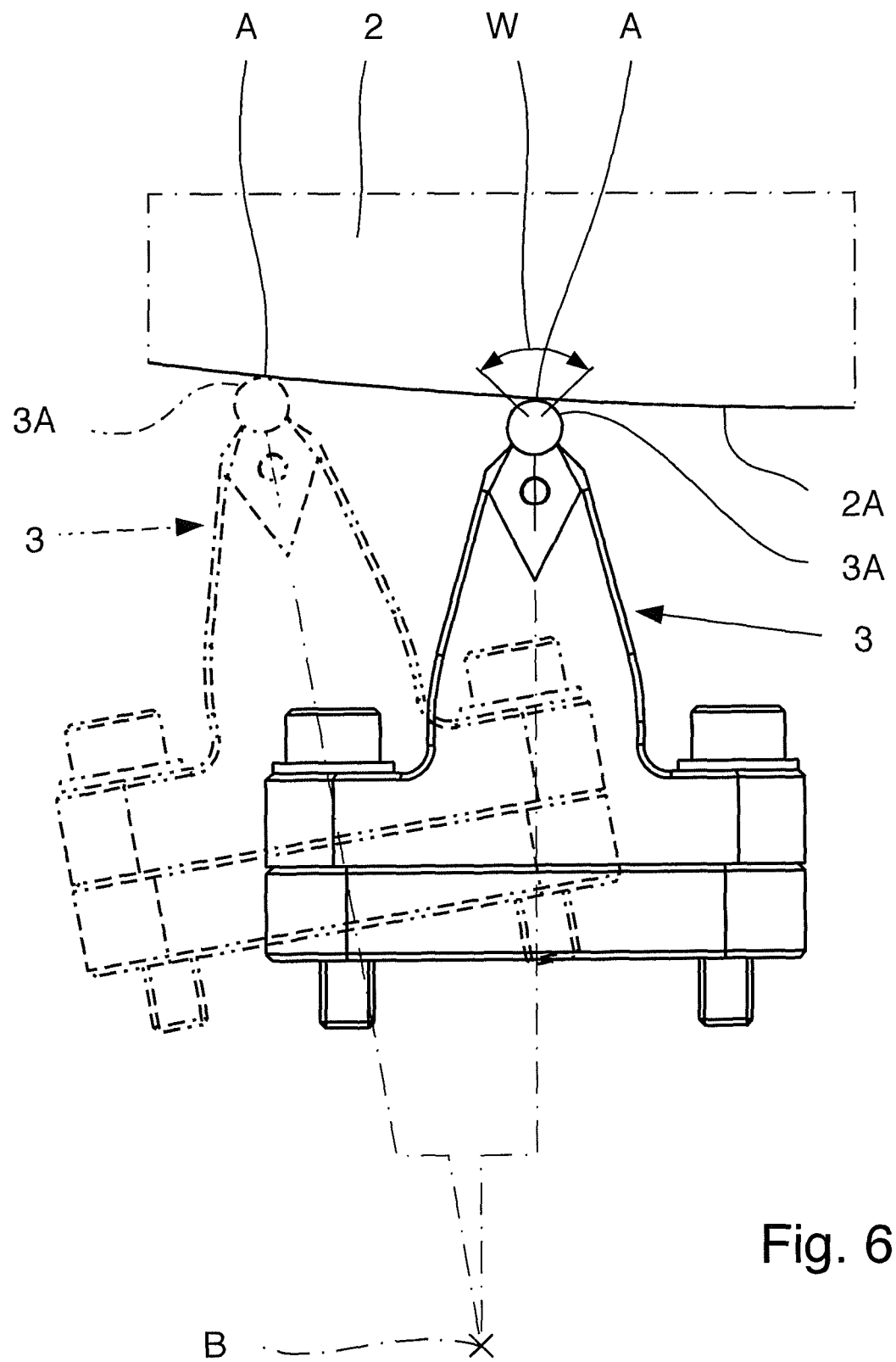
FIG. 6 is a schematic plan view of a workpiece being machined by a tool.

According to one preferred aspect of this invention, during the machining of the flat side 2A of a workpiece 2 the contact point A of a cutting edge 3A of the tool 3 with the workpiece 2 is varied, as suggested in the schematic according to FIG. 6. FIG. 6 shows in a schematic extract view from overhead a part of the workpiece 2 which is to be machined and the tool 3 which acts on the workpiece 2 or its flat side 2A with a cutting edge 3A.

The tool 3 is shown with a solid line in a first position and with a broken line in a second position which is inclined differently.

In particular, the tool 3 is pivoted or turned around an axis transversely or perpendicular to the rotational axis C, in particular, around the vertical axis B, in order to vary the contact point A of the cutting edge 3A with the workpiece 2 and the flat side 2A. Depending on the angle W by which the tool 3 is being turned, the contact point A of the cutting edge 3A with the workpiece 2 is varied. Accordingly, a region or edge region or peripheral region of the cutting edge 3A corresponding to the angle W can be used for machining depending on the rotational position of the tool 3 or tilt of the tool 3 to the workpiece 2.

In one variation of the contact point A, a compensation movement in the X axis can always take place if required.

The wear of the cutting edge 3A during machining can be distributed over a larger region by the preferable variation of the contact point A of the cutting edge 3A with the workpiece 2 during machining of a flat side 2A and the same workpiece 2 so that highly accurate machining of the workpiece 2 or the flat side 2A is enabled or facilitated.

Due to the longer cutting times for complex surfaces, local cutting edge wear often takes place and can impair the machining result. In rotary machining, the cutting edge 3A which projects farthest influences the workpiece geometry so that depending on the machining process (rough machining, finish machining) and the rather long machining time of possibly one hour or more the available cutting edge 3A can be used in a controlled manner over a larger region or peripheral region. This is enabled here in accordance with the invention by pivoting the tool 3 or linear drive 9 so that different cutting regions of the preferably diamond cutting edge 3A can be engaged. In this way, the machining accuracy can be kept very high.

In particular, the angle W by which the tool 3 is pivoted during machining of a workpiece 2 is more than 5°, especially preferably more than 10° and quite especially preferably roughly 20° or more.

In particular, the angle W is less than 30°, especially preferably less than 25°.

Preferably, the workpiece 2 or its flat side 2A is machined in several steps or passes, in particular, first of all, rough machining takes place, and then, finish machining. For example, repeated rough machining, and then, subsequent finish machining can also take place, optionally also in several steps or passes.

Especially preferably, the same tool 3 is used for some or all of the aforementioned machining processes or passes.

Especially preferably, a first region of the cutting edge 3A, especially preferably a lateral region or several (lateral) regions, especially on the two sides of a middle region, is or are used for rough machining, and for finish machining or final machining a second region of the cutting edge 3A, especially preferably a middle region of the cutting edge 3A, is used. If necessary, a separate region of the cutting edge 3A of the same tool 3 can also be used for each machining process or pass. Alternatively or in addition, for machining of the same workpiece 2 several different or identical tools 3 can also be used.

The "middle region" is defined, in particular, as the forward region of the cutting edge 3A of the tool 3 which projects forward toward the workpiece 2 or acts on it during machining when the axis Z2 of movement of the tool 3 is aligned at least essentially parallel to the axis of rotation C of the workpiece 2.

Preferably, the tool 3 comprises an at least essentially rounded or spheroidal cutting edge 3A or a cutting edge 3A which is curved in a plan view or which is made in the manner of a segment of a circle.

The radius of curvature of the cutting edge 3A is preferably at least 0.5, especially more than 1 mm.

The radius of the cutting edge 3A is preferably less than 5 mm, especially less than 3 mm, especially preferably essentially 2 mm or less.

The axis of rotation around which the tool 3 or the linear drive 9 with the tool 3 is pivoted runs preferably at least essentially parallel to the tangential direction of the relative movement of the cutting edge 3A and tool 2 in the region of the contact point A, therefore in the illustrated example at least essentially vertically, since the tool 3 with its cutting edge 3A acts on the workpiece 2 or its flat side 2A at least essentially in a horizontal plane which contains the axis of rotation C, therefore along a horizontal radius.

A method in accordance with the invention for machining of the workpiece 2 is also characterized by the workpiece 2 being fed relative to the tool 3 in the direction of the axis of rotation C by means of at least one linear motor 16, the linear drive 9 being adjusted by means of the slide 10 in a transverse direction X transversely to the axis of rotation C and being pivoted around an axis transversely relative to the axis of rotation C and transverse direction X by means of a turntable 11 which is carried by the slide 10. This enables optimum positioning of the tool 3 and fast and accurate machining with a stroke of the linear drive 9, therefore of the fast tool drive, that is as small as possible, and conversely, longer travel paths can be achieved by, on the other hand, a relatively slow feed of the workpiece 2 or by the, in contrast, relatively slow linear axis Z1.

The device 1 in accordance with the invention and the method in accordance with the invention are especially well suited to high precision machining and/or, for example, to the manufacture of very large metal mirrors or the like.

Preferably, the surface or flat side 2A is machined solely by turning, especially face turning, and finish machined. Therefore, subsequent polishing will especially preferably not need to take place.

The machining accuracy is preferably at least 1 µm. Especially preferably, machining takes place with an accuracy in the range from 10 to 100 nm.

Especially preferably, machining or production of aspherical or non-symmetrical optical surfaces takes place, for example, for heads-up displays or the like.

Preferably, the slide 10 laterally bears a scale 17, as is schematically suggested in FIG. 3. In particular, a corresponding sensor apparatus 18 is assigned to the scale 17 of the slide 10. The sensor apparatus is located or held, for example, on the machine bed 12 or tool drive 4. The details and explanations above relating to the scale 17 on the bearing part 16 and the sensor apparatus 18 which is assigned to it preferably apply here accordingly or in a supplementary manner.

To measure the position of the slide 10, there is preferably an optical measurement system. In particular, there is a scale or a reference straightedge 19 on the slide 10, especially preferably in the region of a rear longitudinal edge, as schematically suggested in FIG. 4. The reference straightedge is preferably at least essentially made like the scale 17 so that the explanations in this respect apply accordingly or in a supplementary manner.

Measuring takes place preferably optically, in particular interferometrically.

Preferably, a sensor apparatus 20 for especially contactless or optical detection of the location of the reference straightedge 19, and thus, of the location of the slide 10 is assigned to the reference straightedge 19. The sensor apparatus 20 is held, for example, by the machine bed 12 or by the workpiece drive 4. But, other structural designs are also possible.

The spindle unit 5 is preferably a so-called slow tool or a relatively slow linear axis Z1.

The device 1 in accordance with the invention and the method in accordance with the invention call preferably for only two slow linear axes or slow axes, specifically the X axis and the Z1 axis. Preferably, only the machining axis or fast tool axis, therefore the fast linear axis Z2 or the tool axis, is added. This is conducive to highly accurate machining.

The machine bed 12 is preferably or at least partially produced from rock, especially granite, and/or is made at least essentially cuboidal.

The strip-shaped projections 12A are produced preferably by corresponding strips, especially of steel. In the illustrated example, the guide strips or steel strips are screwed to the preferably rock or granite machine bed 12.

The measuring takes place preferably optically, especially interferometrically.

The slide 10 is preferably assembled from a cast base support or frame and/or from rock. Especially preferably, the base support is covered by a rock slab which forms a table slab.

The device 1 or the slide 10A preferably has a measurement system, especially a probe 21 in order to be able to measure the workpiece 2 preferably directly in the clamped state. In particular, release and separate measurement of the workpiece 2 are preferably not necessary. The probe 21 is schematically suggested in FIG. 2. The device 1 or the slide 10 has preferably a milling apparatus 22, as is schematically suggested in FIG. 1, in particular in order to be able to produce a highly precise reference surface on the workpiece 2, especially for measurement purposes or correction purposes.

Preferably, the milling apparatus 22 or its cutting tool is aligned to the middle of the workpiece spindle or axis of rotation C so that milling preferably everywhere on the workpiece 2 is possible.

Alternatively or in addition, the milling apparatus 22 can also be used for rough machining or preliminary machining or finish machining of the workpiece 2.

Individual features and aspects of the device 1 or of the method for machining can also be implemented independently of one another and in any combination.

What is claimed is:

1. A device for face turning of a workpiece, comprising:
    a tool,
    a first linearly movable component for linear movement of the workpiece in a first direction of movement,
    a second linearly movable component for linear movement of the tool in a second direction of movement which is different from the first direction of movement, and
    a workpiece drive with a spindle unit, the spindle unit having a bearing part and a spindle which is rotated therein, at least one of the movable components being formed at least in part by the bearing part, and the spindle being provided with a receiver for holding the workpiece,
    wherein both movable components have at least two flat guides for providing hydrostatic guidance in a vertical direction,
    wherein at least one of the movable components has a side guide located under the movable component for providing hydrostatic guidance of the movable component laterally transversely relative to the respective direction of movement, and
    wherein the axis of rotation of the spindle is in a horizontal plane and the flat guides for vertical guidance of the first movable component extend symmetrically to said horizontal plane,
    wherein the bearing part has an at least essentially cylindrical outer contour with flat surfaces in a region of each of the flat guides.

2. The device as claimed in claim 1, wherein the flat guides are adapted for at least one of blades, a scale and at least a primary part of the workpiece drive.

3. The device as claimed in claim 1, wherein the second movable component is a slide.

4. The device as claimed in claim 1, further comprising:
    wherein the second movable component supports a turntable and a center axis of the side guide,
    wherein the turntable carries a linear drive which moves the tool forward and back and which, during face turning of the workpiece, is pivotable for varying a contact point of a cutting edge of the tool on the workpiece by means of the turntable,
    wherein the tool comprises a rounded cutting edge, and
    wherein the radius of curvature of the cutting edge is less than 5 mm.

5. The device as claimed in claim 4, wherein the radius of curvature of the cutting edge is at least 0.5 mm.

6. The device as claimed in claim 1, wherein at least one of the flat guides, side guide and bearing surfaces of the side guide is arranged symmetrically to a vertical center plane of the linearly movable component.

7. The device as claimed in claim 1, wherein at least one of the flat guides and the side guide each has two pockets which are opposite each other in pairs.

8. The device as claimed in claim 7, wherein the pockets are tightly connected to and are movable together with the corresponding movable component.

9. The device as claimed in claim 1, wherein at least one of the flat guides and the side guide each has a blade with at least one of assigned opposite pockets and strip-shaped projections with bearing surfaces for providing fluidic support.

10. The device as claimed in claim 9, wherein the blades are located on flats of the bearing part.

11. The device as claimed in claim 1, wherein the directions of movement are horizontal.

12. The device as claimed in claim 1, wherein the device is adapted for face turning of an optical workpiece.

13. The device as claimed in claim 1, wherein the flat guides-are located on opposite sides of the respective movable component.

14. The device as claimed in claim 13, wherein the flat guides are located on both sides of the spindle or axis of movement or axis of rotation.

15. The device as claimed in claim 1, wherein the side guide only guides in the horizontal direction.

16. The device as claimed in claim 1, wherein
wherein at least one of the flat guides and the side guide each has a blade with at least one of assigned opposite pockets and strip-shaped projections with bearing surfaces for providing fluidic support.

17. The device as claimed in claim 16, wherein the blades are located on flats of the bearing part.

18. The device as claimed in claim 16, wherein at least one of the flat guides and the side guide each has two pockets which are opposite each other in pairs.

19. The device as claimed in claim 18, wherein the pockets are tightly connected to and movable together with the corresponding movable component.

20. A device for face turning of a workpiece, comprising:
a tool,
a linearly movable component for linear movement of the workpiece in a direction of movement, and
a workpiece drive with a spindle unit, the spindle unit having a bearing part, the bearing part forming at least part of the linearly movable component and a spindle which is pivoted therein, the spindle being provided with a receiver for holding the workpiece,
wherein an axis of rotation of the spindle is in a horizontal plane and flat guides for vertical guidance of the movable component extend symmetrically to said horizontal plane
wherein the workpiece drive has a scale which is connected directly to the bearing part, and
wherein the scale is clamped tightly to the bearing part only in an end region of the scale, the end region of the scale being adjacent to the receiver of the spindle.

21. The device as claimed in claim 20, further comprising at least two flat guides for fluidic guidance of the movable component and for support in a vertical direction being located on opposite sides of the movable component and a side guide with bearing surfaces for fluidic guidance of the component lateral transversely to the direction of movement, wherein the flat guides do not form a lateral guide and the lateral guide is formed exclusively by the side guide.

22. The device as claimed in claim 21, wherein at least one of the flat guides, side guide and bearing surfaces is arranged symmetrically to a vertical center plane of the movable component.

23. The device as claimed in claim 21, wherein at least one of the flat guides and the side guide each has two pockets which are opposite each other in pairs.

24. The device as claimed in claim 23, wherein the pockets are tightly connected to the component and are movable together with the component.

25. The device as claimed in claim 21, wherein at least one of the flat guides and the side guide each has a blade with at least one of assigned opposite pockets and strip-shaped projections with bearing surfaces for providing fluidic support.

26. The device as claimed in claim 25, wherein the blades are located on flats of the bearing part.

27. The device as claimed in claim 21, wherein the flat guides and the side guide are constructed in a manner providing hydrostatic guidance.

28. The device as claimed in claim 21, wherein the direction of movement is horizontal.

29. The device as claimed in claim 21, wherein the device is adapted for face turning of an optical workpiece.

30. The device as claimed in claim 21, wherein the side guide is located under the movable component.

31. The device as claimed in claim 20, wherein the device has a measuring apparatus with the scale and an assigned detection apparatus for interferometric detection.

32. The device as claimed in claim 1, wherein both movable components have a side guide.

33. The device as claimed in claim 1, wherein the second linearly movable component is a slide supporting a turntable.

34. The device as claimed in claim 33, wherein the turntable carries a linear drive for moving the tool forward and back.

35. The device as claimed in claim 20, wherein the measuring apparatus is designed for detecting or determining the axial position of the spindle or of the workpiece.

* * * * *